INVENTOR.
ARTHUR SHERMAN

Jan. 25, 1966 A. SHERMAN 3,230,703
PACKAGED ROCKET MOTOR
Filed May 31, 1962 2 Sheets-Sheet 2
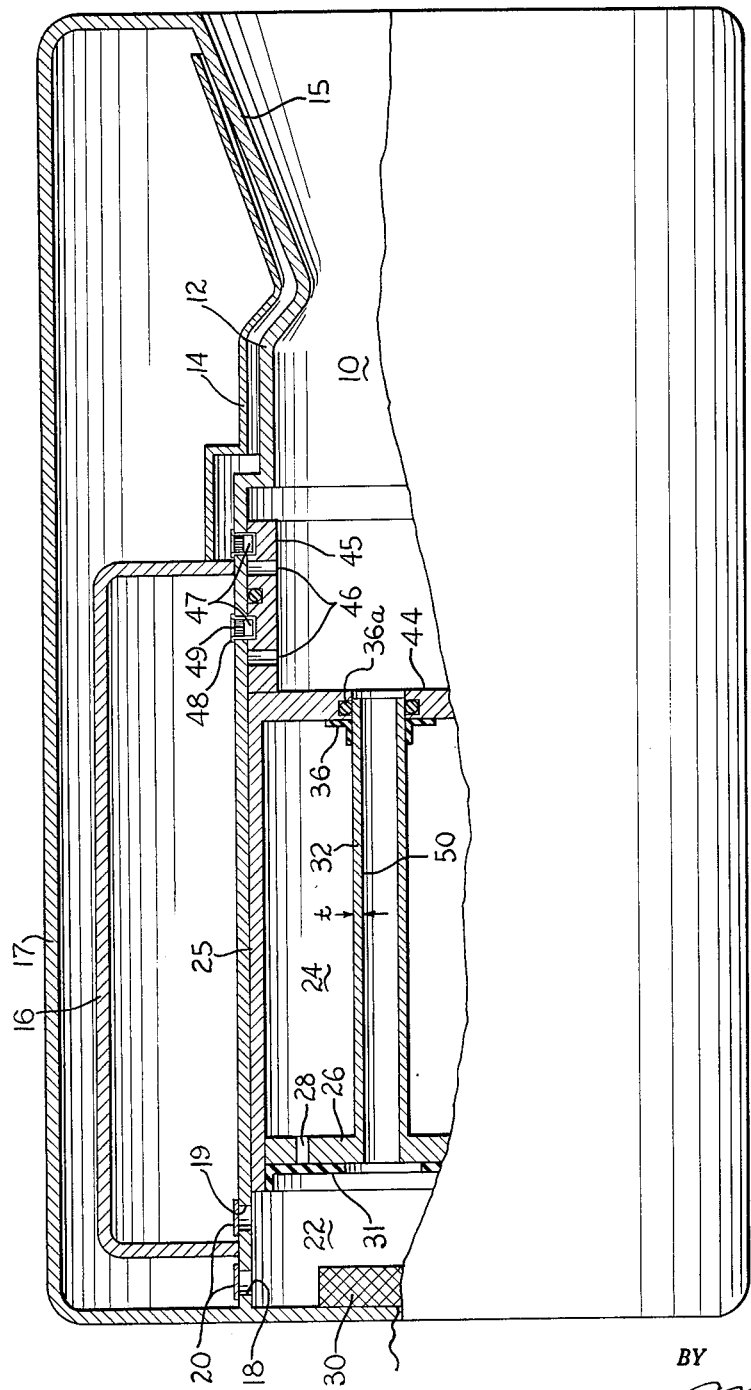
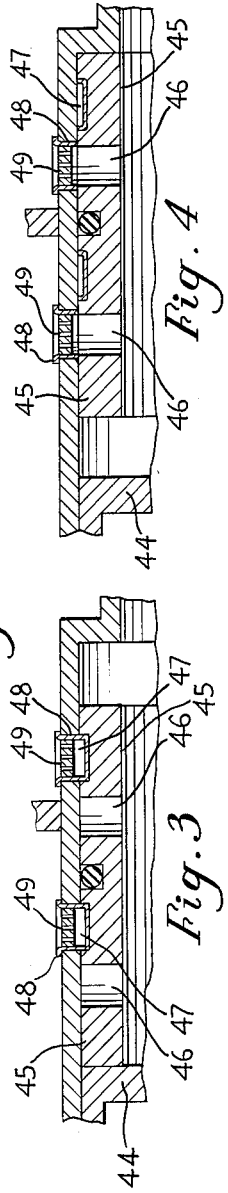
INVENTOR.
ARTHUR SHERMAN
BY
AGENT

United States Patent Office 3,230,703
Patented Jan. 25, 1966

3,230,703
PACKAGED ROCKET MOTOR
Arthur Sherman, West Caldwell, N.J., assignor to Thiokol Chemical Corporation, Bristol, Pa., a corporation of Delaware
Filed May 31, 1962, Ser. No. 199,072
2 Claims. (Cl. 60—35.6)

This invention relates generally to rocket powerplants and more particularly to a packaged liquid propellant powerplant having a liquid propellant gas generator.

It is conventional practice in the art to use a small solid propellant gas generator for propellant tank pressurization and for supplying hot, jet mix gases for ignition and/or efficient combustion of propellants injected into the thrust chamber. This practice developed initially because this type of gas generator offered the advantage of minimum ignition delay and extreme simplicity.

However, it has gradually become apparent that the use of a solid propellant gas generator is characterized by a number of serious disadvantages such as the following four among others:

(1) The design of a solid propellant gas generator is greatly dependent upon the gas flow requirements; solid propellant characteristics, duration, etc. Where durations become long and the distribution of the available gas generator volume is dictated by other considerations, the design of an optimum gas generator becomes very difficult. There have been instances where, when the overall powerplant L/D is high, the thrust level is relatively high, and the duration is long, gas generator design to provide the required throat/port area ratio has been well nigh impossible.

(2) The pressure developed by a solid propellant gas generator is a function of the variation in its burning ratio vs. grain temperature. Unless limited variation propellents known as mesa are selected, and they cannot always be used, this variation in pressure can be as great as 50% or more at temperatures from 650° F. to +160° F. To avoid the necessity of strengthening the tankage to take the elevated pressures at the high temperatures, a relief valve must be installed in the tankage or in the gas generator. In a jet-mix system, the relief valve is "built-in" in the form of the jet mix orifice. Otherwise, a pressure sensitive relief valve or valves are required to prevent over-pressurization of the tankage.

(3) The combustion temperatures of most useable solid propellants are in the 2300° F. to 4800° F. range and all produce very fuel-rich products. For very long durations of gas generation, the high combustion temperatures can induce serious tank and gas generator burnout problems. The problem is aggravated if high thrusts are used with long durations because in order to get reasonable grain geometries, propellants with high burning rates are required. These are unfortunately of the hotter variety. The high temperatures and fuel rich products are also conducive to interaction in the tankage between the gases and the propellants.

(4) Solid propellant gas generators are temperature limited, having safe storage temperature limits well below 200° F.

Accordingly, the main object of the present invention is to provide an improved packaged liquid propellant powerplant which will obviate or alleviate the above and other disadvantages characterizing known structures.

An important object of the present invention is to provide an improved liquid propellant rocket powerplant having a liquid propellant gas generator for pressurizing the propellant tankage.

Another important object of the present invention is to provide a liquid propellant rocket powerplant having a tankage pressurizing gas generator which is flexible in design shape and as to location so as to enable its use in special and unusual installations while still providing adequate gas generator volume.

A further important object of the present invention is to provide an improved liquid propellant rocket powerplant having a tankage pressurizing gas generator in which the pressure developed will be essentially constant regardless of the ambient temperature of the gas generator propellant and eliminate the need for pressure relief valves.

A still further important object of the present invention is to provide an improved liquid propellant rocket powerplant utilizing a pressurizing gas generator propellant which is compatible with or inert to the propellants being pressurized.

Other objects and advantages of the present invention will become apparent during the course of the following description.

In the drawings I have shown two embodiments of the invention. In this showing:

FIGURE 2 is a similar view of a form of the invention utilizing jet-mix of the pressurized propellants; and FIGURE 3 is a fragmentary enlarged sectional view of the shear cups and slide of FIGURE 2.

FIGURE 4 is the same view as in FIGURE 3 except that the slide is shown in the operated position.

Figure 1:
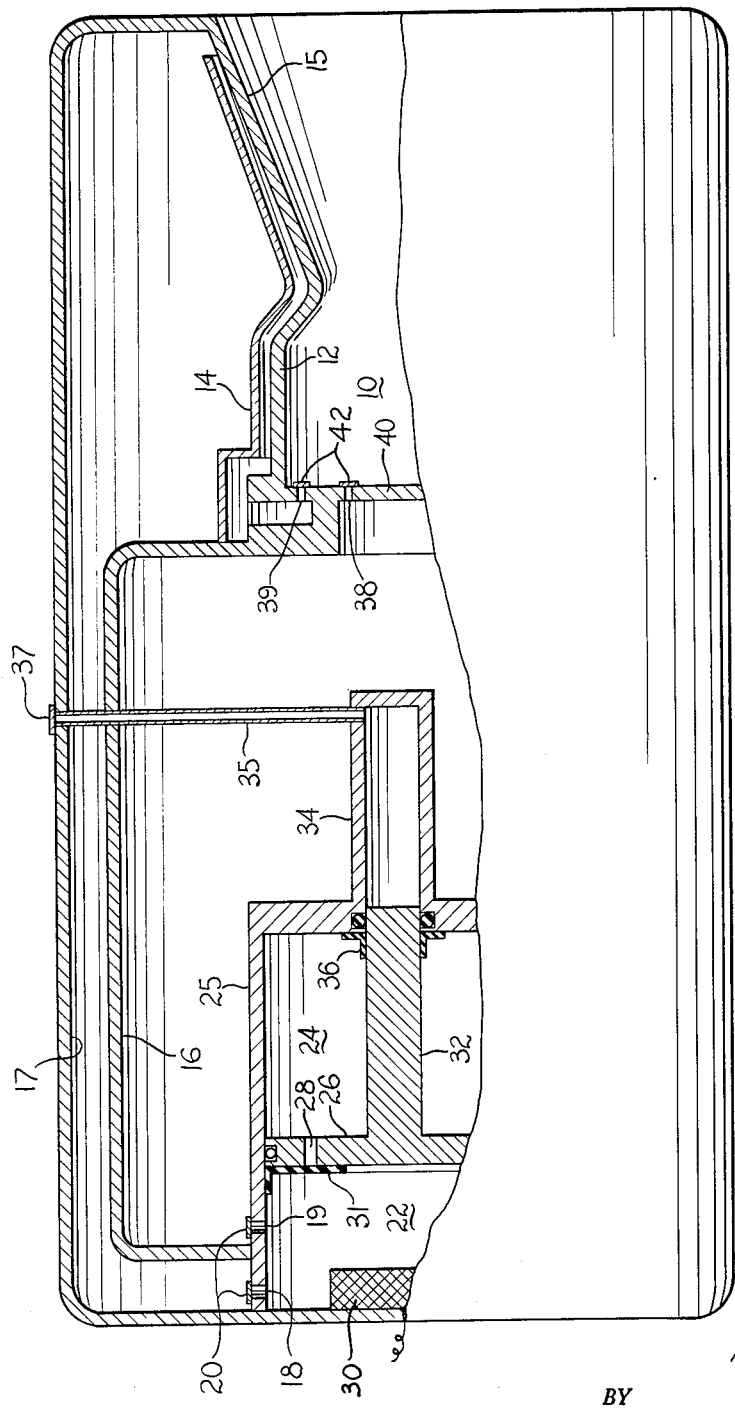
FIGURE 1 is a central longitudinal sectional view of one form of the invention.

Referring to the drawings, the improved liquid propellant rocket powerplant comprising the present invention includes a thrust chamber 10 defined by an inner wall 12 having an outer wall 14 spaced therefrom and terminating in an exhaust nozzle 15, concentric fuel and oxidizer tanks or tankage 16 and 17 arranged partially in tandem and both communicating by pressurizing orifices 18 and 19 sealed by burst bands 20, with a gas generator chamber 22.

The pressurizing medium may be any liquid monopropellant 24 which, as shown in FIGURES 1 and 2 of the drawings, is stored in a cylindrical container 25 centrally located within the fuel and oxidizer tanks 16 and 17. One wall 26 of the container comprises a movable piston having injection orifices 28 communicating with the centrally located gas generator chamber 22, which includes an igniter 30, but which are sealed during storage by burst discs 31.

With reference to FIGURE 1, the piston 26 has a piston rod 32 movable in a closed end guide tube 34 which is vented to the exterior of the powerplant by a vent tube 35, the piston rod being hermetically sealed as at 36 and the vent tube being closed by burst disc 37 during storage. The fuel and oxidizer tanks 16 and 17 communicate with the thrust chamber 10 by injection orifices 38 and 39 respectively in the head 40, these orifices being sealed during storage by burst discs 42.

Operation of the form of the invention shown in FIGURE 1 is initiated by directing an electrical impulse to the igniter 30 thereby igniting it. The pressure developed in the gas generator 22 behind the piston 26 as a result of firing the igniter 30, creates a differential pressure force across the face of the piston because of the unbalanced area of the piston rod 32. The magnitude of the pressure differential thus created is directly related to the relative area of the piston rod and the face of the piston itself.

The resulting pressure differential ruptures the hermetic seal 31 and the liquid monopropellant 24 is injected through the piston orifices 28 into the gas generator 22 where it becomes ignited and decomposition is initiated. The decomposition of the monopropellant in the gas generator sustains the pressure differential and the piston 26 continues to move to the right expelling the remainder of the monopropellant into the gas generator 22. The burst disc 37 of the vent tube 35 is, of course, ruptured by the pressure to the right of the piston rod 32 as it begins to move to thus permit free movement thereof.

The pressure developed as a result of firing the igniter 30 and the ensuing decomposition of the monopropellant 24 ruptures the burst discs 20 and admits pressurizing gas into the fuel and oxidizer tanks 16 and 17 to pressurize the main propellants. As the pressure in the tanks rises, the burst discs 42 across the fuel and oxidizer injection orifices 38 and 39 are ruptured and the main propellants are injected into the thrust chamber 10 where they ignite spontaneously if hypergolic, or with an igniter (not shown) if necessary.

In the embodiment of the invention disclosed in FIGURES 2, 3 and 4, similar numbers have been used when the parts are identical to those of FIGURE 1. In this form, the liquid monopropellant 24 is stored along the central axis of the rocket powerplant within the propellant tankage 16, 17 in a separate, slidably movable cylindrical container 44.

In storage, the container 44 rests against a conventional shear slide 45 having spaced propellant ports 46 and spaced recesses 47 which support the shear cups 48 which in turn seal the propellant injection orifices 49. The piston 26 and the rod 32 are respectively sealed at 31, 36 and 36a. The piston rod 32 is provided with a central, axial bore 50 by which the gas generator chamber 22 communicates with the thrust chamber 10.

Operation of this form of the invention is also initiated by firing the igniter 30. The resultant gas pressure forces the monopropellant container 44 against the shear slide 45 rupturing the shear cups 48 which seal the propellant tanks and thus permitting the main propellants to be injected into the thrust chamber 10.

The pressure differential in this case is established by the unbalanced annular area caused by the thickness $t$ of the piston rod 32. The pressure differential again results in a rupture of the hermetic seals 31, 36 and injection of the monopropellant into the gas generator 22. The decomposition of the monopropellant creates sufficient pressure in chamber 22 to burst the discs 20 to pressurize the tanks 16 and 17 and to maintain the pressure differential to move both the piston 26 and the container 44.

Jet mix gases pass from the gas generator 22 through the piston rod bore 50 into the thrust chamber 10 to ignite and/or provide turbulence for efficient combustion of the main propellants injected through the shear slide 45. During expulsion of the liquid monopropellant 24 from the container 44, the piston rod 32 is permitted to extend into the combustion chamber where it is burnt off. If desired, it may be constructed of a plastic to simplify the matter.

It will now be apparent that because the pressurant 24 is stored in liquid form, the design and location of the storage container can be varied to suit particular installation requirements. As long as an adequate gas generator volume is provided for initiating decomposition of the monopropellant, the storage container unit may be fitted to any installation. For example, it can be adapted to a spherical installation wherein a differential diaphragm is used in place of the cylindrical piston.

The pressure developed by a liquid monopropellant gas generator will be essentially constant regardless of the ambient temperature of the monopropellant, since the rate of decomposition is not directly related to the propellant's ambient temperature. Hence, if the approach of FIGURE 1 is used, tank relief valves to prevent overpressurization will not be required, whereas they would be if a solid propellant gas generator were used.

With respect to the problem of pressurizing gas temperatures, liquid monopropellants are superior in this respect because the flame temperature of the decomposition products is predictable in most cases and is well below the flame temperature of currently available solid propellants which have been used to any extent operationally. This is an especially important advantage of the liquid monopropellant system as compared to solid propellant systems in the case of high thrust, long duration packaged liquid units. With an ethylene oxide, for example, a flame temperature in the order of 1800° F. can be obtained. The liquid propellant can be stored in any configuration to suit the application requirements and can be run for any duration at a temperature within the metallurgical limitations of present day materials. By contrast, a fast burning rate solid propellant gas generator such as would be required to stay within a reasonable geometry, would probably produce flame temperatures of over 3000 F. This would result in severe thermal problems with the gas generator and propellant tankage assembly.

The availability of the lower flame temperature which the liquid monopropellant offers reduces any problems which may arise as a result of attempts to dilute the combustion products and lower their temperature even further. The decomposition products of most liquid monopropellants are fuel rich as are the combustion products of solid propellant compositions. However, by selection of suitable monopropellants, it might be possible to achieve combustion products which are compatible or relatively inert with respect to the propellants being pressurized. Regardless of this however, the lower flame temperature of the liquid monopropellant should reduce the tendency for the pressurizing gases and the main propellants to interact violently.

The safe storage temperature limit of most liquid monopropellants is well above the normally required pre-firing temperature of such a powerplant. In most cases they far exceed the auto-ignition temperature of presently used solid propellant compositions. The disclosed designs are simple. The piston rod 32 extending into either the fuel tank or the thrust chamber does not increase the length of the system and the overall volume lost as a result of the piston rod is very small because small differential areas will provide the required injector pressure drop.

It is to be understood that the forms of my invention herewith shown and described are to be taken as preferred examples of the same and that various changes in the shape, size and arrangement of parts may be resorted to without departure from the spirit of the invention or the scope of the subjoined claims.

What is claimed is:

1. A liquid propellant rocket powerplant comprising, in combination, a thrust chamber terminating in a nozzle, a gas generator, main propellant tankage including a propellant communicating with said chamber and with said generator, at least one burst disc sealing said communication with said generator and at least one shear cup sealing said communication with said thrust chamber, a shear slide slidably mounted in said chamber and supporting said shear cup, said slide having at least one main propellant port alignable with the communication sealed by said cup upon movement of said slide, a container including a liquid monopropellant slidably mounted in said chamber against said shear slide and having a movable wall including an aperture communicating with said generator, a burst disc sealing said aperture, and an igniter mounted in said generator and operable upon ignition to apply pressure to said wall and through said monopropellant to said container to move it and said shear slide to rupture said shear cup and align said propellant port with the communication sealed by said cup and inject monopropellant into said generator to generate gases to burst said discs and pressurize said tankage to force main propellant through said aligned port into said thrust chamber.

2. A liquid propellant rocket powerplant comprising, in combination, a thrust chamber terminating in a nozzle, a gas generator, main propellant tankage including a propellant communicating with said chamber and with said generator, at least one burst disc sealing said communication with said generator and at least one shear cup sealing said communication with said thrust chamber, a shear slide slidably mounted in said chamber and supporting said shear cup, said slide having at least one main propellant port alignable with the communication sealed by said cup upon movement of said slide, a container including a liquid monopropellant slidably mounted in said chamber against said shear slide and having a movable wall including an aperture communicating with said generator, a burst disc sealing said aperture, and an igniter mounted in said generator and operable upon ignition to apply pressure to said container to move it and said shear slide to rupture said shear cup and align said propellant port with the communication sealed by said cup, and pressure to said wall to injet monopropellant into said generator to generate gases to burst said discs and pressurize said tankage to force main propellant through said aligned port into said thrust chamber.

References Cited by the Examiner

UNITED STATES PATENTS 2,408,111  9/1946  Truax et al.
2,992,528  7/1961  Ozanich et al. ____ 60—39.48 X

FOREIGN PATENTS 809,031  2/1959  Great Britain.

MARK NEWMAN, *Primary Examiner.*

JULIUS E. WEST, CARLTON R. CROYLE, SAMUEL LEVINE, *Examiners.*